(12) United States Patent
Takechi et al.

(10) Patent No.: US 9,236,640 B2
(45) Date of Patent: Jan. 12, 2016

(54) GAS BATTERY COMPRISING CARBON DIOXIDE GAS AS A POSITIVE ELECTRODE ACTIVE MATERIAL AND METHOD OF USE OF GAS BATTERY

(75) Inventors: Kensuke Takechi, Nagoya (JP); Tohru Shiga, Okazaki (JP)

(73) Assignee: KABUSHIKI KAISHA TOYOTA CHUO KENKYUSHO, Aichi-Gun (JP)

( * ) Notice: Subject to any disclaimer, the term of this patent is extended or adjusted under 35 U.S.C. 154(b) by 1200 days.

(21) Appl. No.: 12/881,619

(22) Filed: Sep. 14, 2010

(65) Prior Publication Data
US 2011/0070505 A1 Mar. 24, 2011

(30) Foreign Application Priority Data

Sep. 24, 2009 (JP) .................................. 2009-219462

(51) Int. Cl.
| | |
|---|---|
| *H01M 8/22* | (2006.01) |
| *H01M 14/00* | (2006.01) |
| *H01M 12/06* | (2006.01) |
| *H01M 12/08* | (2006.01) |
| *H01M 4/38* | (2006.01) |
| *H01M 8/04* | (2006.01) |

(52) U.S. Cl.
CPC .............. *H01M 12/06* (2013.01); *H01M 12/08* (2013.01); *H01M 4/382* (2013.01); *H01M 8/04208* (2013.01)

(58) Field of Classification Search
CPC ............ H01M 8/00; H01M 8/02; H01M 8/22
USPC ......................................................... 252/62.2
See application file for complete search history.

(56) References Cited

U.S. PATENT DOCUMENTS

| | | | | | |
|---|---|---|---|---|---|
| 4,591,538 | A | * | 5/1986 | Kunz ............................ | 429/464 |
| 5,213,908 | A | * | 5/1993 | Hagedorn ..................... | 429/454 |
| 2007/0259236 | A1 | * | 11/2007 | Lang et al. ...................... | 429/30 |
| 2008/0176124 | A1 | * | 7/2008 | Imagawa et al. ................ | 429/27 |
| 2009/0061315 | A1 | * | 3/2009 | Nakano et al. ............. | 429/218.1 |

FOREIGN PATENT DOCUMENTS

JP   A-2006-286414   10/2006

OTHER PUBLICATIONS

"Carbon Dioxide Activation by Lithium Metal", Kafafi et al., Journal of the American Chemical Society, 105, 3886-3893, 1983.*
"On the Gas Voltaic Battery", Grove, W.R., Phil. Trans. R. Soc. Lond., 133, p. 91-112, Jan. 1, 1843.*

* cited by examiner

*Primary Examiner* — Kenneth Douyette
(74) *Attorney, Agent, or Firm* — Oliff PLC

(57) ABSTRACT

In an F-type electrochemical cell 20, in a casing 21, a positive electrode 23 in which carbon dioxide gas is used as a positive electrode active material and a negative electrode 25 are placed so as to face each other with a separator 27 therebetween, and an electrolyte solution 28 is injected between the positive electrode 23 and the negative electrode 25. A tank 30 storing carbon dioxide gas is connected to the positive electrode 23, and carbon dioxide gas is supplied to the positive electrode 23 through a holding member 29. By supplying carbon dioxide gas to the positive electrode in such a manner, the cell can be operated as a battery. Furthermore, when used a primary battery, carbon dioxide can be immobilized in the battery, which is desirable.

2 Claims, 3 Drawing Sheets

GAS BATTERY COMPRISING CARBON DIOXIDE GAS AS A POSITIVE ELECTRODE ACTIVE MATERIAL AND METHOD OF USE OF GAS BATTERY

BACKGROUND OF THE INVENTION

1. Field of the Invention

The present invention relates to a gas battery and a method of use of the gas battery.

2. Description of the Related Art

Air batteries are known in which a metal is used as the negative electrode active material, and oxygen in air is used as the positive electrode active material. In such air batteries, since it is not necessary to store oxygen, which is the positive electrode active material, in the battery, it is expected that the capacity of air batteries will increase. As one of such air batteries, for example, a battery having a positive electrode in which a positive electrode of an air battery and a positive electrode of a normal lithium ion secondary battery are combined has been proposed (for example, refer to Japanese Unexamined Patent Application Publication No. 2006-286414). In this air battery, while suppressing degradation of the negative electrode active material by decreasing the amount of air to be supplied, electric power is also supplied by the lithium ion secondary battery as another battery. Therefore, it is considered to be possible to increase the battery capacity.

SUMMARY OF THE INVENTION

Even in the air battery described in Japanese Unexamined Patent Application Publication No. 2006-286414 or the like, in the case where a higher discharge capacity is required, it is necessary to supply a gas having a high oxygen concentration. In some cases, oxygen gas is used. Under these circumstances, development of a novel gas battery which uses a gas replacing oxygen gas has been desired.

The present invention has been achieved to solve the problem described above, and it is a main object of the present invention to provide a novel gas battery which uses a gas replacing oxygen gas and a method of use of such a gas battery.

In order to achieve the object described above, the present inventors have selected carbon dioxide gas as the gas to be supplied to a gas battery and have found that by doing so, the gas battery operates properly, thereby completing the present invention.

The present invention provides a gas battery including:
a supply portion which supplies carbon dioxide gas;
a positive electrode in which the carbon dioxide gas supplied from the supply portion is used as a positive electrode active material;
a negative electrode which includes a negative electrode active material; and
an ion-conducting medium interposed between the positive electrode and the negative electrode.

The present invention also provides a method of use of a gas battery including a positive electrode in which a gas is used as a positive electrode active material, a negative electrode which includes a negative electrode active material, an ion-conducting medium interposed between the positive electrode and the negative electrode, and a supply portion which supplies a feed gas to the positive electrode,
the method of use including supplying carbon dioxide gas as the feed gas to the positive electrode.

In the present invention, a gas battery can be operated using carbon dioxide gas as a feed gas, and charging and discharging can be repeated. The reason for obtaining such effects is not clear, but it is assumed that carbon dioxide gas reacts with metal ions in an ion-conducting medium to produce a carbonate during discharging of the battery, and reaction energy in this process can be extracted as electrical energy. Furthermore, it is assumed that the resulting carbonate is decomposed during charging of the battery to release carbon dioxide, and the carbon dioxide released can be used again in the discharge reaction, thus making it possible to perform charging and discharging repeatedly.

DESCRIPTION OF THE PREFERRED EMBODIMENTS

Figure 1:
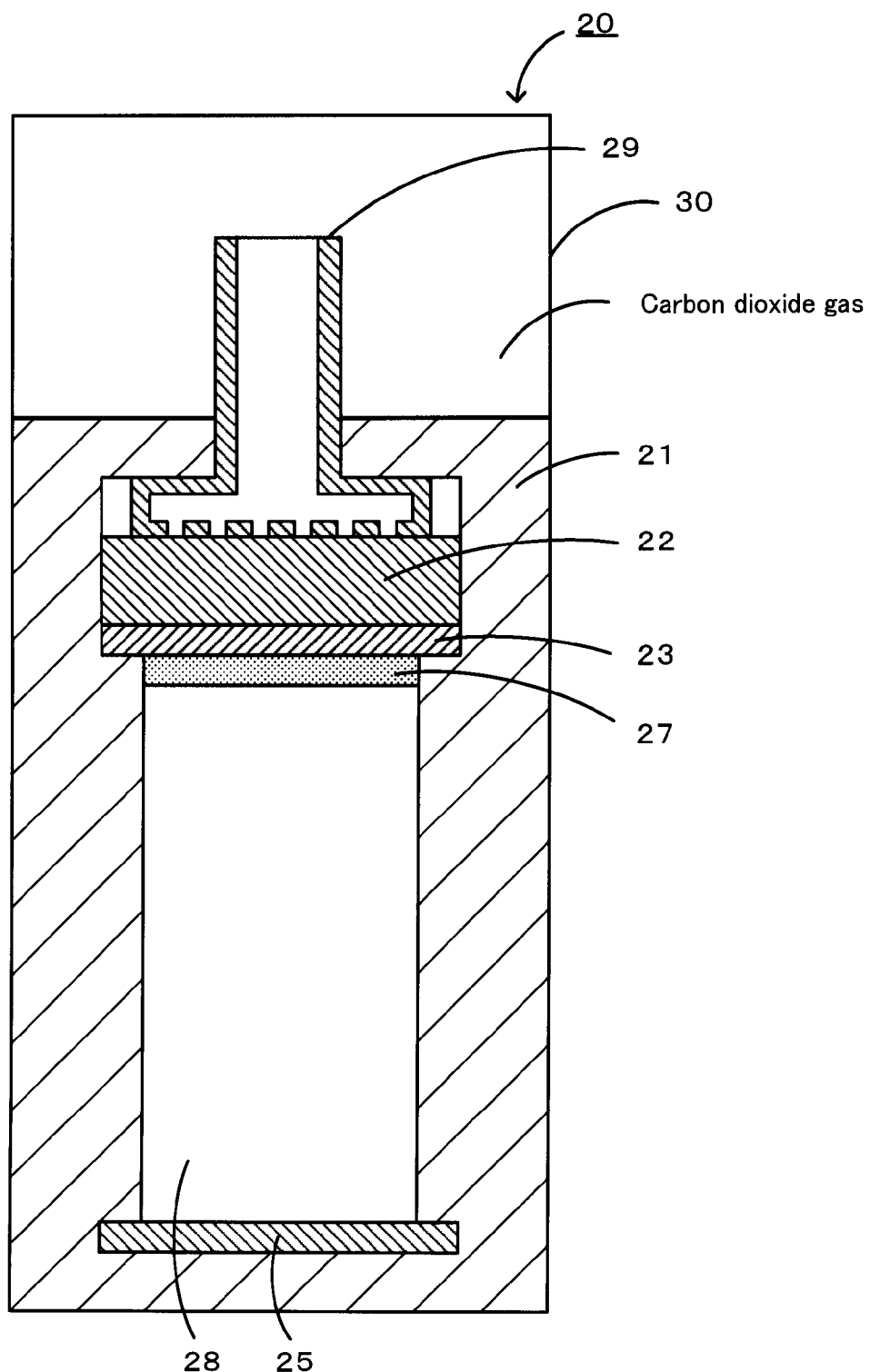
FIG. 1 is a cross-sectional view of an F-type electrochemical cell 20.

An embodiment exemplifying the present invention will now be described. A gas battery of the present invention includes a supply portion which supplies carbon dioxide gas, a positive electrode in which the carbon dioxide gas supplied from the supply portion is used as a positive electrode active material, a negative electrode which includes a negative electrode active material, and an ion-conducting medium interposed between the positive electrode and the negative electrode.

In the gas battery of the present invention, the supply portion supplies carbon dioxide gas to the positive electrode. The carbon dioxide gas may contain an inert gas or the like that is not involved in the battery reaction, and may contain oxygen as long as its amount is less than 1% by volume. This is because the reaction of carbon dioxide is promoted by such a gas. Examples of the inert gas include nitrogen gas, helium gas, and argon gas. The carbon dioxide gas is reduced at the positive electrode during discharging of the battery as shown in Formula (1), and thus the battery can be operated. In this process, the carbon dioxide gas generates carbonate ions, and it is believed that the carbonate ions further react with metal ions in the ion-conducting medium to produce a carbonate, which is deposited on the positive electrode. When the gas battery of the present invention is used as a primary battery, it is believed to be possible to immobilize carbon dioxide, which is considered to be a substance which causes global warming, in the battery. Furthermore, in this case, for example, by using high-concentration carbon dioxide or the like after a combustion step, power generation can be performed, which is desirable from the standpoint that reduction in environmental contamination and supply of energy can be achieved at the same time.

[Formula 1]

$$2CO_2 + 2e^- \rightarrow CO_3^{2-} + CO \qquad (1)$$

In the gas battery of the present invention, the supply portion may be, for example, configured to include a tank and an air hole provided in the tank so that carbon dioxide gas can be supplied through the air hole to the positive electrode. The air hole may be a through-hole provided in a metal plate or the like, or may be in the form of a mesh or a pipe. Any tank that can store carbon dioxide gas can be used as the tank. For example, the tank may be a gas cylinder that stores compressed carbon dioxide gas, or a tank that stores gas under atmospheric pressure. Furthermore, the tank may be configured to cover the entire power generating member including the electrodes, the ion-conducting medium, and the like, or the tank may be provided on the positive electrode side. As the material for the tank, a metal, a resin, or the like can be used.

In the gas battery of the present invention, the positive electrode uses the carbon dioxide gas supplied from the supply portion as a positive electrode active material. In the gas battery, the positive electrode may contain an oxidation-reduction catalyst that promotes oxidation-reduction of the carbon dioxide gas as the positive electrode active material. Examples of the oxidation-reduction catalyst for carbon dioxide include electrolytic manganese dioxide, cobalt phthalocyanine, cobalt porphyrin, cerium oxide ($CeO_2$), aluminum oxide ($Al_2O_3$), titanium oxide ($TiO_2$), silver oxide (AgO), lithium tungstate ($Li_2WO_4$), lithium molybdate ($Li_2MoO_4$), lithium manganese cobalt oxide ($LiMn_xCo_yO_4$), lanthanum calcium cobalt complex oxide ($La_xCa_yCoO_{3-z}$), lanthanum strontium cobalt oxide ($La_xSr_yCoO_{3-z}$), sodium lanthanum manganese oxide ($Na_xLa_yMnO_3$), potassium lanthanum manganese oxide ($K_xLa_yMnO_{3-z}$), copper manganese complex oxide ($Cu_xMn_yO_4$), and manganese oxide ($MnO_2$). The oxidation-reduction catalyst may be supported on a carbon material, such as Ketjenblack, serving as a catalyst carrier.

In the gas battery of the present invention, the positive electrode may contain a conductive material. The conductive material is not particularly limited as long as it has conductivity and is stable in the potential window in the range of use of the battery. From the standpoint of increasing output, the conductive material is preferably a porous conductive material with a large specific surface. Examples of such a material include carbon. Examples of carbon that can be used include carbon blacks, such as Ketjenblack, acetylene black, channel black, furnace black, lampblack, and thermal black; graphites, such as natural graphite (e.g., flaky graphite), artificial graphite, and expanded graphite; activated carbons made from charcoal, coal, and the like; and carbon fibers obtained by carbonizing synthetic fibers, petroleum pitch materials, and the like. Examples of the conductive material further include conductive fibers, such as metal fibers; metal powders, such as nickel powder and aluminum powder; and organic conductive materials, such as polyphenylene derivatives. These may be used alone or as a mixture of two or more of them. Furthermore, the positive electrode may contain a metal oxide, such as lithium oxide, or a metal peroxide, such as lithium peroxide.

In the gas battery of the present invention, the positive electrode may contain a binder. The binder is not particularly limited, and for example, a thermoplastic resin, a thermosetting resin, or the like may be used. Examples thereof include polyethylene, polypropylene, polytetrafluoroethylene (PTFE), polyvinylidene fluoride (PVDF), styrene-butadiene rubber, tetrafluoroethylene-hexafluoroethylene copolymers, tetrafluoroethylene-hexafluoropropylene (FEP) copolymers, tetrafluoroethylene-perfluoroalkylvinylether (PFA) copolymers, vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene (ECTFE) copolymers, vinylidene fluoride-hexafluoropropylene-tetrafluoroethylene copolymers, vinylidene fluoride-perfluoromethylvinylether-tetrafluoroethylene copolymers, and ethylene-acrylic acid copolymers. These may be used alone or as a mixture of two or more of them.

In the gas battery of the present invention, the positive electrode may be formed by a method in which the conductive material, the binder, and the like are mixed and rolled into a sheet shape, and the resulting sheet is pressed onto a current collector. The mixing method may be wet mixing in the presence of a solvent, such as ethanol, or dry mixing using a mortar or the like. The current collector is not particularly limited as long as it is composed of a conductive material. Preferably, the current collector is composed of stainless steel, nickel, aluminum, copper, or the like. Furthermore, in order to rapidly diffuse carbon dioxide gas, preferably, the current collector is a porous body, such as a net-like or mesh-like body. In addition, in order to suppress oxidation, the surface of the current collector may be coated with a film of oxidation resistant metal or alloy.

In the gas battery of the present invention, the negative electrode includes a negative electrode active material. The negative electrode active material is not particularly limited. Preferably, the negative electrode active material can occlude and release at least one of a metal or metal ions. Examples of the metal or metal ions to be occluded and released include metals, such as lithium, sodium, potassium, magnesium, calcium, aluminum, and zinc, and ions thereof. Among them, metals, such as lithium, magnesium, and calcium, or ions thereof are more preferable. Examples of the negative electrode active material that can occlude and release lithium metal or lithium ions include, in addition to metallic lithium and lithium alloys, metal oxides, metal sulfides, and carbonaceous materials which occlude and release lithium ions. Examples of the lithium alloys include alloys of lithium and metals, such as aluminum, tin, magnesium, indium, and calcium. Examples of the metal oxides include tin oxides, silicon oxides, lithium titanium oxides, niobium oxides, and tungsten oxides. Examples of the metal sulfides include tin sulfides and titanium sulfides. Examples of the carbonaceous materials which occlude and release lithium ions include graphite, cokes, mesophase pitch carbon fibers, spherical carbon, and resin-fired carbon. The negative electrode may be formed by a method in which the negative electrode active material and the conductive material, the binder, and the like, which are exemplified in the description of the positive electrode, are mixed and rolled into a sheet shape, and the resulting sheet is pressed onto a current collector.

In the gas battery of the present invention, the ion-conducting medium interposed between the positive electrode and the negative electrode can conduct metal ions. The metal ions are occluded and released as a metal or metal ions at the negative electrode. In the gas battery of the present invention, the ion-conducting medium may contain an electrolyte. As the electrolyte, although not particularly limited thereto, a known electrolyte, such as $LiPF_6$, $LiClO_4$, $LiAsF_6$, $LiBF_4$, $Li(CF_3SO_2)_2N$, $Li(CF_3SO_3)$, or $LiN(C_2F_5SO_2)_2$, can be used. These electrolytes may be used alone or in combination of two or more. Furthermore, the ion-conducting medium is preferably a nonaqueous ion-conducting medium. As the nonaqueous ion-conducting medium, for example, a nonaqueous electrolyte solution including the electrolyte described above can be used. The concentration of the electrolyte in the nonaqueous electrolyte solution is preferably 0.1 to 2.0 mol/L, and more preferably 0.8 to 1.2 mol/L. As the nonaqueous electrolyte solution, an aprotic organic solvent can be used. Examples of such an organic solvent include cyclic carbonates, chain carbonates, cyclic esters, cyclic ethers, and chain ethers. Examples of cyclic carbonates include ethylene carbonate, propylene carbonate, butylene carbonate, and vinylene carbonate. Examples of chain carbonates include dimethyl carbonate, diethyl carbonate, and methyl ethyl carbonate. Examples of cyclic ester carbonates include gamma-butyrolactone and gamma-valerolactone. Examples of cyclic ethers include tetrahydrofuran and 2-methyltetrahydrofuran. Examples of chain ethers include dimethoxyethane and ethylene glycol dimethyl ether. These may be used alone or as a mixture of two or more of them. Other examples of the ion-conducting medium that can be used include nitrile solvents, such as acetonitrile and propylnitrile; ionic liquids; and gel electrolytes.

In a method of use of a gas battery according to the present invention, the gas battery includes a positive electrode in which a gas is used as a positive electrode active material, a negative electrode which includes a negative electrode active material, an ion-conducting medium interposed between the positive electrode and the negative electrode, and a supply portion which supplies a feed gas to the positive electrode, and carbon dioxide gas is supplied as the feed gas to the positive electrode. The gas battery to be used can be configured the same as the gas battery of the present invention described above. The carbon dioxide gas to be supplied may contain an inert gas or the like that is not involved in the battery reaction, and may contain oxygen as long as its amount is less than 1% by volume. The carbon dioxide gas is reduced at the positive electrode during discharging of the battery as shown in Formula (1) described above, and thus the battery can be operated.

The feed gas is not necessarily provided on the gas battery. The gas battery may be connected to a gas cylinder or the like during use so that the feed gas can be supplied to the gas battery. In such a manner, replacement with a new mixed gas or the like can be easily performed, which is desirable.

The present invention is not limited to the above embodiment. Various modifications may be made within the technical scope of the present invention.

EXAMPLES

An example in which a gas battery of the present invention was specifically fabricated will be described below.

Example 1

A positive electrode was formed as described below. First, ethanol was added as a solvent to 5.2 parts by weight of electrolytic manganese dioxide (manufactured by Mitsui Kinzoku Kozan Co., Ltd.) as a catalyst, 84.5 parts by weight of Ketjenblack ECP-600 (manufactured by Mitsubishi Chemical Corporation) as a catalyst carrier, and 10.3 parts by weight of polytetrafluoroethylene (manufactured by Daikin Industries, Ltd.) as a binder, and mixing and kneading were performed thoroughly, followed by rolling to form a sheet-shaped positive electrode member. The positive electrode member was pressure-bonded to a stainless steel (SUS304) mesh (#50, wire diameter 0.12 mm), and vacuum drying was performed for 120 minutes in an oven at 100° C. Thereby, a positive electrode was obtained. As a negative electrode, metallic lithium was used. Using these electrodes, an F-type electrochemical cell 20 manufactured by Hokuto Denko Corp. was assembled. FIG. 1 shows a cross-sectional view of the F-type electrochemical cell 20.

The F-type electrochemical cell 20 was assembled as follows. First, a negative electrode 25 was placed in a SUS casing 21. A positive electrode 23 was set so as to face the negative electrode 25 with a separator 27 made of polyethylene therebetween. An electrolyte solution 28 prepared by dissolving 1 M of lithium bis(trifluoromethanesulfonyl) imide in a solution (manufactured by Tomiyama Pure Chemical Industries, Ltd.) composed of 30 parts by weight of ethylene carbonate and 70 parts by weight of diethyl carbonate was injected between the positive electrode 23 and the negative electrode 25. Subsequently, a foamed nickel plate 22 was placed on the positive electrode 23, and a holding member 29, through which gas can pass to the positive electrode 23 side, was pressed thereagainst from above to fix the cell. Thus, the F-type electrochemical cell 20 was obtained. Although not shown in FIG. 1, the casing 21 is separable into an upper portion in contact with the positive electrode 23 and a lower portion in contact with the negative electrode 25, and an insulating resin is interposed between the upper portion and the lower portion. Accordingly, the positive electrode 23 is electrically insulated from the negative electrode 25.

Figure 2:
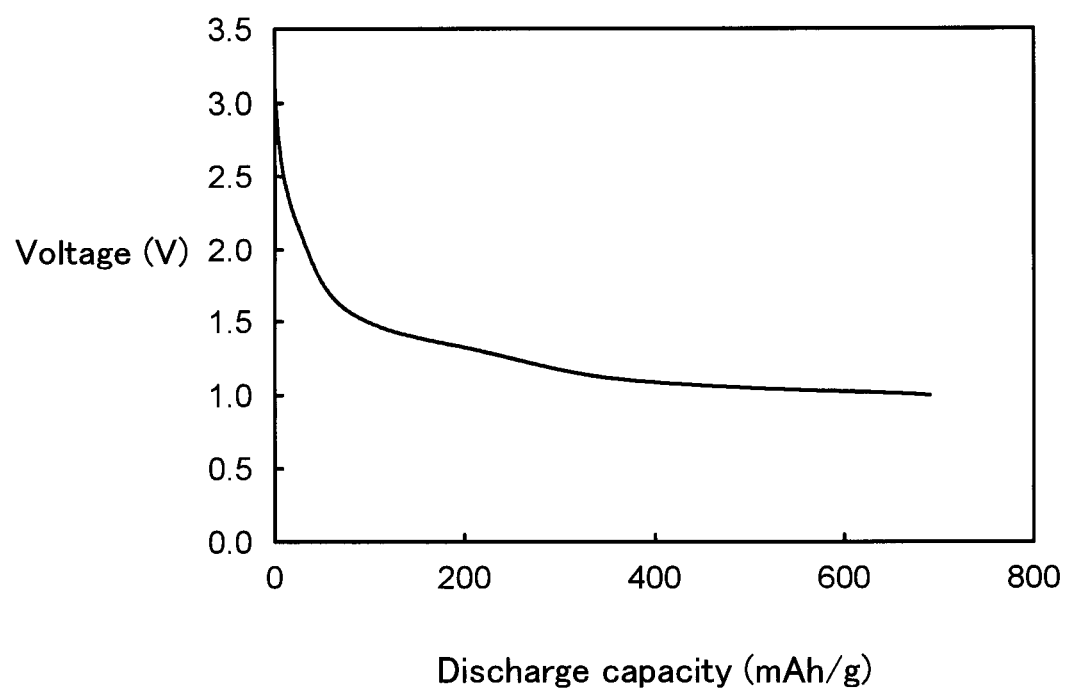
FIG. 2 shows a discharge curve in a discharge test in Example 1.

The F-type electrochemical cell 20 thus obtained was set in a charge/discharge device (Model: HJ1001SM8A) manufactured by Hokuto Denko Corporation. A tank 30 containing carbon dioxide gas in which the internal pressure was adjusted to about 0.2 MPa was connected to the holding member 29 to supply the feed gas, and discharge was performed with a current of 50 mA per 1 g of the positive electrode member until the voltage became 1.0 V. FIG. 2 shows a discharge curve in the discharge test in Example 1. In this test, the discharge capacity was 691 mAh/g for the positive electrode member.

Figure 3:
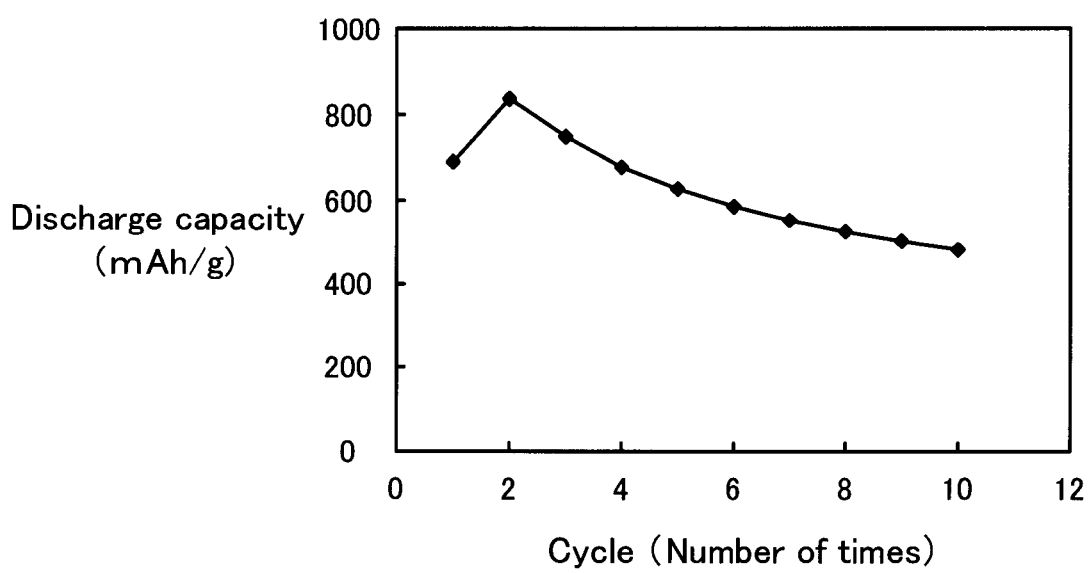
FIG. 3 is a graph showing the relationship between the number of cycles and the discharge capacity in a charge/discharge cycling test in Example 1.

Subsequent to the discharge, charge was performed with a current of 20 mA per 1 g of the positive electrode member until the voltage became 4.5 V, and a charge/discharge cycling test was further performed in which charge and discharge were repeated in such a manner. FIG. 3 is a graph showing the relationship between the number of cycles and the discharge capacity in the charge/discharge cycling test in Example 1.

As is evident from the results, even when carbon dioxide gas is used as the gas to be supplied to the positive electrode of the gas battery, a high discharge capacity can be obtained. As is also evident from the above, charging and discharging can be repeated. The reason for this is assumed to be that lithium carbonate deposited on the positive electrode is removed and carbon dioxide is released by charging, and carbon dioxide can be used again for the discharge reaction.

The present application claims the benefit of the priority from Japanese Patent Application No. 2009-219462 filed on Sep. 24, 2009, the entire contents of which are incorporated herein by reference.

What is claimed is:
1. A gas battery comprising:
  a supply portion which supplies carbon dioxide gas containing less than 1 vol % oxygen gas;
  a positive electrode in which the carbon dioxide gas supplied from the supply portion is used as a positive electrode active material;
  a negative electrode which includes a negative electrode active material that is configured to occlude and release at least one of a metal or metal ions, the negative electrode active material comprising lithium; and
  an ion-conducting medium comprising a non-aqueous electrolytic solution, the ion-conducting medium being interposed between the positive electrode and the negative electrode, the ion-conducting medium being occluded as a metal or metal ions at the negative electrode and conducting metal ions which form carbonate ions and salt.

2. A method of using a gas battery, the gas battery comprising:
- a positive electrode in which a gas is used as a positive electrode active material,
- a negative electrode which includes a negative electrode active material that is configured to occlude and release at least one of a metal or metal ions, the negative electrode active material comprising lithium,
- an ion-conducting medium comprising a non-aqueous electrolytic solution, the ion-conducting medium being interposed between the positive electrode and the negative electrode, the ion-conducting medium being occluded as a metal or metal ions at the negative electrode and conducting metal ions which form carbonate ions and salt, and
- a supply portion which supplies a feed gas to the positive electrode, the method comprising supplying carbon dioxide gas containing less than 1 vol % oxygen gas as the feed gas to the positive electrode.

* * * * *